United States Patent [19]
Wilcox

[11] Patent Number: 4,962,437
[45] Date of Patent: Oct. 9, 1990

[54] THIN FILM SERVO HEAD EMPLOYING THE INACTIVE TRANSDUCER COILS TO CANCEL WRITE NOISE FROM NEARBY DATA HEADS

[75] Inventor: Lawrence A. Wilcox, Yukon, Okla.

[73] Assignee: Magnetic Peripherals Inc., Minnetonka, Minn.

[21] Appl. No.: 471,018

[22] Filed: Jan. 19, 1990

Related U.S. Application Data

[63] Continuation of Ser. No. 159,878, Feb. 24, 1988, abandoned.

[51] Int. Cl.⁵ .......................... G11B 5/60; G11B 5/17
[52] U.S. Cl. .................................. 360/103; 360/124; 360/122
[58] Field of Search .............. 360/103, 122, 124, 121, 360/123

[56] References Cited

U.S. PATENT DOCUMENTS

| | | | |
|---|---|---|---|
| 3,287,713 | 11/1966 | Porter | 360/124 X |
| 3,585,314 | 6/1971 | Korn | 360/65 |
| 3,959,824 | 5/1976 | Ohi et al. | 360/124 |
| 3,969,769 | 7/1976 | Gorter et al. | 360/113 |
| 4,008,493 | 2/1977 | Pizzuto | 360/124 |
| 4,072,994 | 2/1978 | Takashima | 360/124 |
| 4,184,631 | 1/1980 | Lazzari | 360/113 X |
| 4,245,268 | 1/1981 | Toshimitsu | 360/124 |
| 4,291,352 | 9/1981 | Gooch | 360/121 |
| 4,369,476 | 1/1983 | Karsh | 360/123 |
| 4,458,279 | 7/1984 | Katz | 360/121 X |
| 4,581,663 | 4/1986 | Tanaka | 360/103 X |
| 4,729,048 | 3/1988 | Imakashi et al. | 360/103 |
| 4,757,410 | 7/1988 | Seko et al. | 360/113 |

*Primary Examiner*—Robert S. Tupper
*Assistant Examiner*—Andrew L. Sniezek
*Attorney, Agent, or Firm*—Edward P. Heller, III

[57] ABSTRACT

A disc drive servo head having two thin film transducers, one of which is disabled from reading by lapping away its pole tips. The coils of the disabled transducer are oppositely wound from the usable transducer's and induce an equal and opposite signal from background noise, such as generated by adjacent data heads during write. The signals from the disabled tranducer coils are combined with the signals from the usable transducer during reading of servo data to concel background noise.

2 Claims, 4 Drawing Sheets

U.S. Patent  Oct. 9, 1990  Sheet 1 of 4  4,962,437
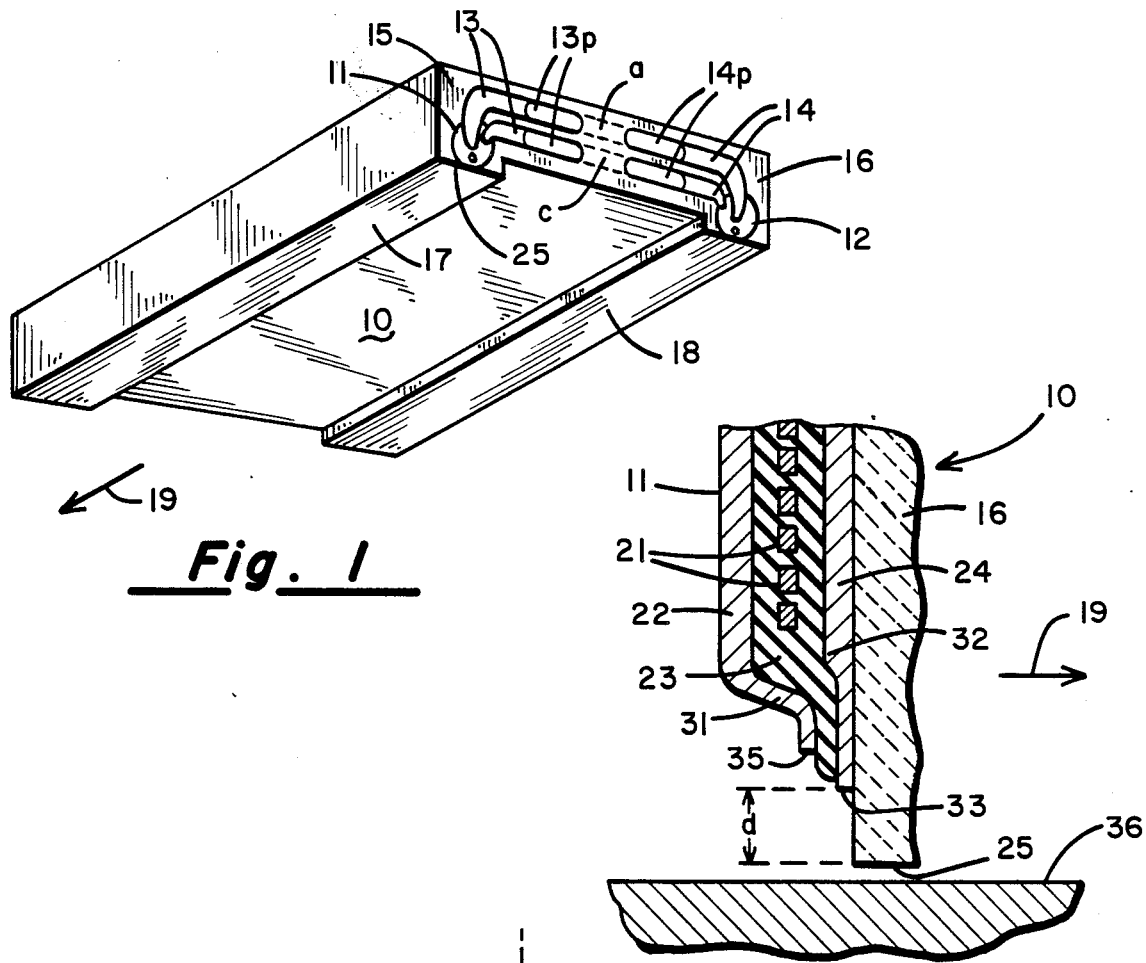
Fig. 1
Fig. 3
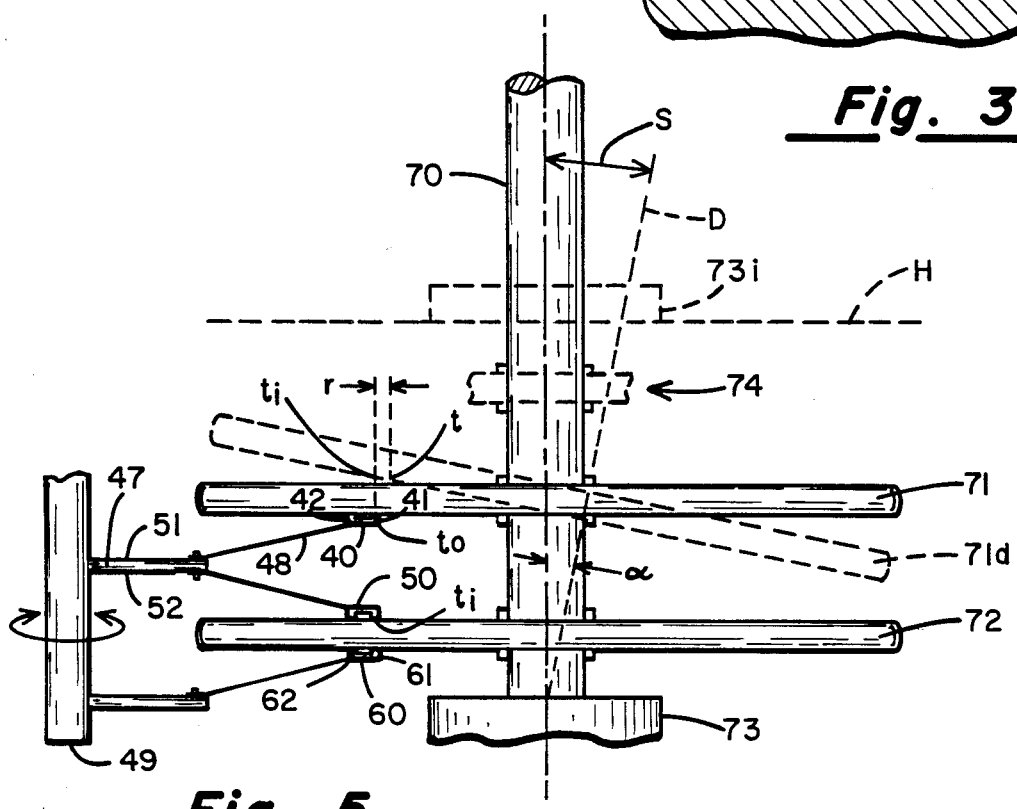
Fig. 5

THIN FILM SERVO HEAD EMPLOYING THE INACTIVE TRANSDUCER COILS TO CANCEL WRITE NOISE FROM NEARBY DATA HEADS

This is a continuation of copending application Ser. No. 07/159,878 filed on 02/24/88 now abandoned.

This invention relates to the field of improvements in the reading characteristics of read and read/write heads for use in magnetic disk drives and has particular application to such heads used for reading servo information.

BACKGROUND

This invention is an answer to a long recognized set of problems in disk drive construction which heretofore limited track density. A short explanation of disk drive construction is in order.

In the high density magnetic storage device art, the primary means for storing data is on surfaces of circular platters or disks which have been coated with magnetic media. The disks are usually mounted, centered and spaced apart, on a spindle. The spindle is most often mounted in a housing by means of a single bearing. Due to this structure, the spindle will not remain without wobble, and the amount of the wobble will vary with temperature, age, and numerous other known or presumed variables. The further from the bearing the measure is taken, the greater the wobble will be.

The magnetic transducers which read and write data to and from the disk are mounted on a comb-shaped structure the "teeth" of which would hold the transducers at appropriate locations between the platters. These teeth are called head arms and the comb is called a head arm assembly. The transducers are in or on the heads, at the ends of the head arms.

Since the transducers are thus all in a plane, no matter where they are radially over their respective disk, dedicating one transducer to reading servo tracks (the reading of which indicates its relative or absolute radial location) provides a very accurate indication of where all the transducers are, radially. Unfortunately, the disk furthest from the bearing will have a great deal more wobble in it than the one nearest the bearing, thus if you place the servo tracks and transducer on the platter nearest the bearing you may space the tracks apart very narrowly, but lose that resolution, progressively, and unpredictably to some extent, as you move to platters successively further from the bearing. So, the servo tracks would be the best predictors of transducer-to-track correspondence (across all the disks on a spindle) would be at the central disk.

While the resolution will not be as fine as if the servo transducer were on the bearing end of the spindle, it is much better than having the servo transducer at the far end of the spindle. If the servo transducer were on the bearing end, the number of servo tracks would be limited by the greatest possible wobble at the far end.

Clearly, the best location for a servo platter is where the relative displacement between the servo head following the servo track and the furthest head from the servo head track is smallest, i.e., the center platter. Thus, the relative displacement between the servo track being followed at either end is equal.

In the preferred embodiment, however, the reason for locating the head off the end platters is even more compelling. The preferred embodiment has a bearing at both ends of the spindle. Therefore the greatest wobble will be found on either end, and in all likelihood the wobble will be in opposite directions on opposite ends of the spindle.

Cross-talk problems are encountered where a central disk is used for servo, however, and because no satisfactory way within this system had been found to ameliorate cross-talk, disk drives had heretofore been built with the servo platter on one end, usually the bearing end. This invention alleviates the cross-talk problem on a central platter and allows for the use of a single-plane transducer assembly, in one case with the servo transducer on the same head arm as a read/write head and in another on a dedicated head arm. In the drive assembly in this invention, two bearings are used, one at each end of the spindle.

Cross-talk problems can occur for several reasons, including cross-talk between the wires which read the transducer pick-ups when these wires are adjacent one another, or from other transducers writing during the time the servo head is reading.

Other ways to eliminate cross talk problems may include putting the servo head on an arm apart form the head arm assembly, or, as is commonly done, putting the servo head on the last disk on the bearing end of the spindle, and dedicating that arm to the servo head. (Usually each arm carries two heads.)

This patent is not the first to describe use of a coil which is somehow inactive to cancel some cross talk problems. Perhaps the closest in general concept is the patent issued to Pizzuto, U.S. Pat. No. 4,008,493 which uses two coils of opposite polarity to cancel noise. The Pizzuto design, however is used to cancel cross talk derived from the same media, whereas the instant case solves the problem caused by writing of heads on other platters which produce a radiated field, the effect of which is to cause cross talk problems. In Pizzuto, the two coils are in the same head, whereas in the instant case the transducers are on opposite ends of the flyer, and thus relatively far from one another. In FIGS. 4, 8, and 9 of Pizzuto, the inactive transducer is shown to ride away from the media, in the instant invention, it must remain over the media as does the active transducer. Lastly, this invention uses thin film manufacturing techniques which are not similar to the techniques used to build the kinds of transducers shown in Pizzuto.

U.S. Pat. No. 4,291,352 issued to Gooch is concerned with reducing surface leakage flux induced cross talk between channels in a multichannel read head, and also does not address the radiated field cross talk problem. It also is concerned with tape drive transducers.

Of interest also is the Ohi, et al., reference, U.S. Pat. No. 3,959,824, which uses a sheild of metal between a writing transducer and the read transducer, along with a pair of oppositely wound coils to cancel the write-generated noise.

Additional designs for reducing tape transducer cross talk are shown in U.S. Pat. Nos. 3,585,314, 3,287,713 and 4,369,476, but these are considered cumulative to those previously described.

Toshimitsu, U.S. Pat. No. 4,245,268 shows the use of specially shaped coil and core structures to cancel radiated field noise. By virtue of the technology, wound core, for tape drive, it does not require that the compensating coil be in the same planar orientation as is the case with the thin film technology used with the instant invention in disk drives. The location of the coil in Toshimitsu appears to be critical, which is not the case with the instant case.

Lazzari, U.S. Pat. No. 4,184,631 applies to the magneto-resistive sensor art, but it includes a compensating magneto-resistive element. It is useful in the check reading art.

SUMMARY OF THE INVENTION

Substantially identical mirror image thin film transducers are mounted on the flyer which rides on an air bearing over the media on the servo disk. These are connected electrically, the top of one coil connected to the top of the other coil and the bottoms to each other, too. One transducer is active and reads the servo information and the other is inactive because it is mounted so that it cannot read the servo disk with any more strength than the ambient noise. The level of the cross talk is coincident with the level of the ambient noise.

Use of a double wound coil for each transducer is shown. Also described is how to employ such flyers for servo heads, including description of the associated disk drive structure.

BRIEF DESCRIPTION OF THE DRAWINGS

FIG. 1 is a perspective view of a flyer that carries two transducers.

FIG. 3 is a sectional side view of the transducer of FIG. 2 taken at line 3—3.

FIG. 5 is a sketch of the parts of a disk drive relevant to show the positioning and functioning of the parts affected by this invention.

DETAILED DESCRIPTION OF THE INVENTION

Figure 2:
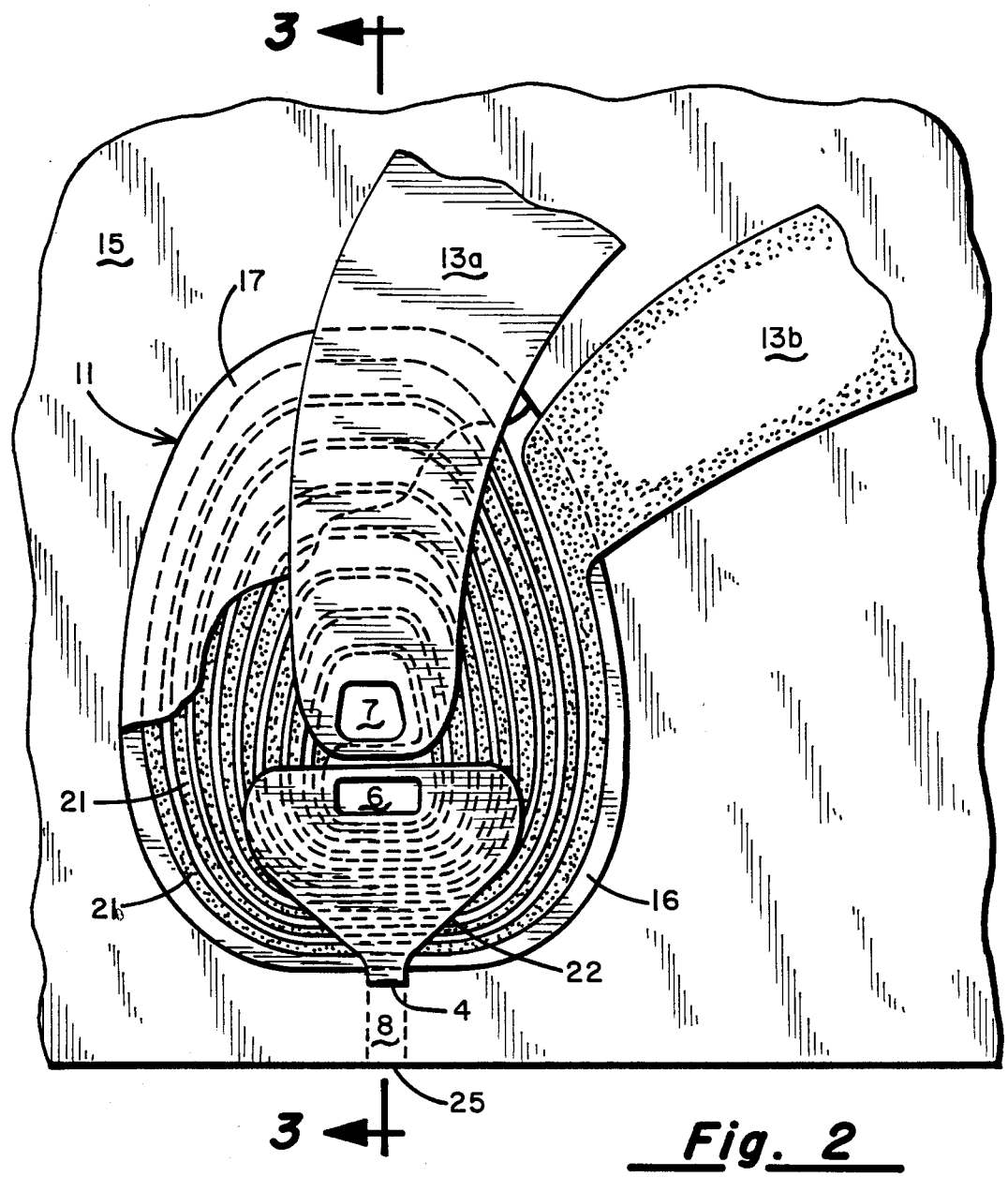
FIG. 2 is a view of a single thin-film transducer on the back side of a flyer, taken from the back of the flyer, and having part of the transducer removed to reveal the coil and other detail.

Referring first to FIG. 1, a typical flyer is shown, designated with the numeral 10. The body of it 10 is usually a material such as alsimag (a Nickel-Aluminum alloy) and it is usually shaped to fly over the surface of a disk just above the skis 17 and 18 in the direction 19. The trailing side or back 15 will usually have the transducer 11 or 12 for reading and/or writing to the magnetic media being flown over (not shown). Most often, only one of the transducers is functional and it will be connected to the circuitry for delivering and interpreting electric current or voltage through the leads 13 or 14 connected to the associated pads 13p or 14p, respectively. An insulating layer 16 is between the transducers 11 and 12 and the back 15 of the flyer 10.

The pads are shown disconnected as they were in prior art, for illustration purposes, however the dotted line pairs a and c indicate where the pads would need to be continuous for a flyer that uses this invention. The connection will be described in detail with reference to FIG. 4.

Referring now to FIG. 2, transducer 11 is shown in greater detail with the insulating layer 16 removed from the flyer's back 15 except where it is under the transducer coil 21. Leads 13a and 13b form the tips of the leads 13 in the view of FIG. 1. The insulator 17 which covers the coil 21 is partially removed for this view.

The coil 21 is connected to lead 13a by the via 7, which extends through the insulator 17. The upper part of the core 22 is connected to its lower part 24 (shown in FIG. 3, described below) by another via 6, this being magnetically conductive material such as alsimag, while via 7 would be of electrically conductive material such as copper or gold, for example.

Of primary importance to this invention is the pair of dotted lines which outline where the core pole tips would not extend on an inactive transducer. This region 8 would be a continuation of pole tips 22 and 24 to the flying surface 25 in the case of an active transducer. As shown with the region unfilled, the pole tips are too far from the flying surface to read the media. The distance from the pole tip of the inactive transducer 4 to the flying surface can be anywhere from about 0.25 mils to whatever the practical limit for physical placement of the transducer is. The relevant consideration for deciding on this distance is whether in the device in which the flyer will be used, the inactive transducer will be able to pick up the data on the disk adjacent the flyer at a level greater than that of ambient noise. Through experimentation this distance was found to be about 500 microinches or ½ mil, where the region 8 (along with the underlying materials which make up the back part of the flyer 15 and the insulator 15) is originally laid down as a continuous pole tip and removed by lapping. In the preferred embodiment, the region 8 is simply not laid down when the transducer 11 is created. In this latter method, the distance between the pole tip gap at 4 and the flying surface edge 25 has been chosen to be between 4 and 7 mils, although some variation is obviously possible without deviating from the scope of this invention. Obviously, for example, ½ mil would be acceptable.

At a flying height (distance of flying surface from media) of roughly 6 to 12 microinches, with a pole tip gap of roughly 40 microinches, the available write field strength which can reach the disk from this transducer will be lowered from 3000 oe. to less than 30 oe., and the read back or pick up level from the disk will be reduced from 500 microvolts to less than 10. Such a transducer is thus made "inactive."

In FIG. 3, the back end of flyer 10 is shown flying on an air bearing between flying surface 25 and media surface 36, moving, relative to the media, in direction indicated by arrow 19. In this sectional view the coil 21 can be seen, electrically insulated from the two parts of the core 22 and 24 by the layer of insulator 23 (alumina preferred, but other materials will do). The whole transducer 11 is electrically isolated from the flyer by the insulating substrate 16. It may be noted that the tips 31 and 32 of the pole pieces are more narrow than the rest of the core.

In this sectional view, the transducer 11 is shown to be set back in its formation process by displacement, not by lapping. If it were set back by lapping, the surface 25 would be at the level of surface 33 (the end of pole tip 32) and pole tip 31 would also extend that far. Also, in the case of lapping the level of surface 25 in the area of the inactive transducer 11 would be further from the media 36 then the rest of the flyer's surface 25, as described above; roughly 500 microinches as opposed to 6–12 for the bulk of the flyer.

In FIG. 3 however, the transducer is set back or "displaced" when it is manufactured, without the extra process of lapping. Thus, the first grown or plated pole tip and core 32, 24, must be laid down larger than the upper one 22 and 31, in order that the end 35 of pole tip 31 is a known distance from pole tip 32. This is not a problem where they both are built to extend to the original flying surface at 25, because they are set back by lapping, thus the pre-lapped ends need not be a set gap height from each other.

Figure 4:
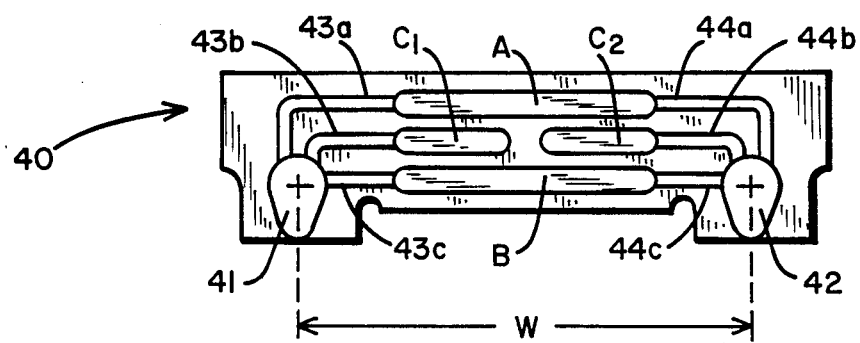
FIG. 4 is a back view of a flyer showing both transducers.

Referring now to FIG. 4, the back 45 of a flyer 40 is shown, having an active transducer 41 and an inactive transducer 42. Note that the back of this flyer 40 is different in lead and pad structure from flyer 10 of FIG. 1. Here, there are three lead pairs (a, b, and c), labeled 43a and 44a, 43b and 44b, 43c and 44c, while in FIG. 1 there are only two, connected in the illustration by dotted line pairs a and c. The inclusion of the pair 43b, 44b, is shown here to illustrate the preferred embodiment form of the invention, which uses a double wound coil having a center tap connected to the pads C1 or C2 by 43b or 44b, respectively.

The invention will operate on the single coil transducers described above, so long as the winding of the inactive transducer is a mirror image of (i.e. reverse wound from) the winding of the active transducer. In so doing, the ambient signal received will be the same but will be sent 180° out of phase from that received by its mirror image wound coil from the coil leads to the connected pads A and B. Thus, the only signal produced by the electrically connected pair is the data signal received by the active transducer. Of course, the wires which transmit this signal along the head arm will be bonded in electrical connection to these pads. (In the preferred embodiment, the active transducer will also have a lead wire bonded to its pad C, to enable the active transducer to write, as well as read.) The distance w, between the centers of one transducer to the next in the preferred embodiment is approximately 115 mils.

In FIG. 5, the flyer 40 is shown mounted to a head arm 47 by a spring arm 48 which is connected to a rotatable axle 49 to which all the arms are also attached. The rotation of axle 49 moves the heads radially across the surface of their adjacent disks. The axle, arms, springs and heads or flyers are called a head arm assembly. In this figure only a small portion of the storage device is shown and numerous disks are usually mounted to the spindle 70. For purposes of this discussion it should be assumed that disk 71 is a centrally located disk, or, in other words that a third disk (like partial disk 74) is mounted to the spindle above it, with disk 72 mounted below. The spindle 70 is mounted in the storage device by means of its connection to its bearing, 73. (The bearing is usually, in fact, two bearings which lends some added stability to the spindle. It could be called a bearing assembly when the two are at one end of the spindle with respect to the platters.)

In the preferred embodiment bearings are used at both far ends of the spindle, and therefore the centrally located disk is most likely to experience the least wobble and thermal drift. The distance between the transducer of the centrally located servo head and its track is a constant because the servo head follows the servo tracks. The wobbling of the outer disks causes the data to track distance to be greater or less, depending on the relative position of the disk to the data heads. Therefore the greater the distance from the servo head the greater the margin of error one has to account for in designing track spacing. Since the axis of a wobble would be through a point probably midway between the bearings, if the servo were at one end the effect of the wobble would be doubled in the relative motion of the far end data head. In FIG. 5, a realative location for such spaced apart bearings is shown, bearing 73i is shown connected to an inner housing wall H, and disk 73 is located midway between the bearings. When viewing FIG. 5, the reader should ignore bearing 73i, except for the platter between the bearing cases. All other explanations relying on FIG. 5 assume bearing 73i is absent.

To show that the track densities achievable with this invention are substantially greater than those available where the servo head is on the platter closest to the bearing, still with reference to FIG. 5, a centerline CL and a displaced line D are shown, diverging at an angle ALPHA, to yield a very large displacement s. The corresponding displacement of a track to is shown as r, where the displaced disk, shown as 71d has the track to at location tw, which is not in line with the original vertical location ti. Further toward the bearing 73 the displacement from ti will be less than r and the displacement from the corresponding ti on the disk above disk 72 will be greater than r. These locations designated by ti, are the track locales readable or writable by the transducer corresponding to that platter surface. Thus, assuming that transducer 61 is the servo transducer, transducer 41, reads data from the track location to, until the displacement (wobble) is introduced. At that time transducer 41 will be pulled by the spring 48 to a point very near to ti, when it ought to be following track to. Therefore since it is known that the displacement will be about r at the under surface of disk 71, the spacing between tracks on disk 71 must be something greater than r to avoid errors in track reading. Moving to consideration of the next transducer and platter away from the bearing 73, the relative displacement would be even greater, causing an even greater requirement for wide track spacing. (Due to the exaggeration of the drawing the disks are less wide and the arms (47) less long, and the wobble (angle ALPHA) greater than they would be in an actual assembly).

On the other hand, if the servo tranducer were 41, it would follow track to and the relative displacement of transducer 61 would be equal to that of the corresponding transducer on the third platter up from the bearing (not shown.). Thus it can be seen why the use of a middle platter for servo is useful.

In the case of the preferred embodiment where there are bearings on both ends of the spindle, the efficacy of centrally located servo is even greater. The center of the wobble axis would most likely be midway between the bearings, and the relative displacement from data head to data track would be least the nearer the center point the data head and associated platter is located.

Where a flyer is located in the center, again, the problem of cross-talk arises by virtue of the fact that the wires connecting the leads from the servo transducer to its read circuit and the wires connecting corresponding leads from a data head on the same arm to its read/write circuit are in proximity, causing a capacitive coupling. It has been found that this problem can be reduced or eliminated by putting the wires of opposite sides of the arm which supports both heads. This cross-talk problem is not the same one solved by the presence of the inactive transducer, but can be considered a feature of this invention.

Figure 6A:
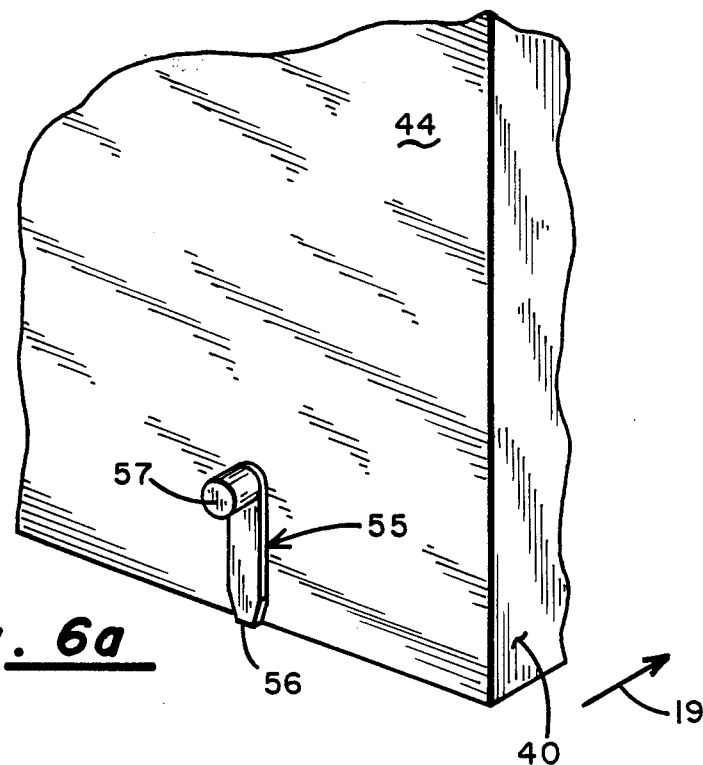
FIGS. 6a–6g are six sequentially ordered sketches illustrating seven stages in thin film head building, culminating in the type of head preferred for use with this invention, shown in FIG. 6g.

Referring now to FIG. 6a, the first step in plating on the active transducer is shown. In the preferred embodiment the inactive transducer is built in the same way except for it being built higher up on surface 44 on which an insulating layer (not shown) isolates the transducer from the flyer 40. The orientation of the flyer 40 is shown by the arrow 19 indicating future movement relative to a media surface. In this first step, the lower pole piece 55 is laid down, with a narrowed tip 56 and via 57 (a piece roughly corresponding to the via 6 of FIG. 2).

Figure 6B:
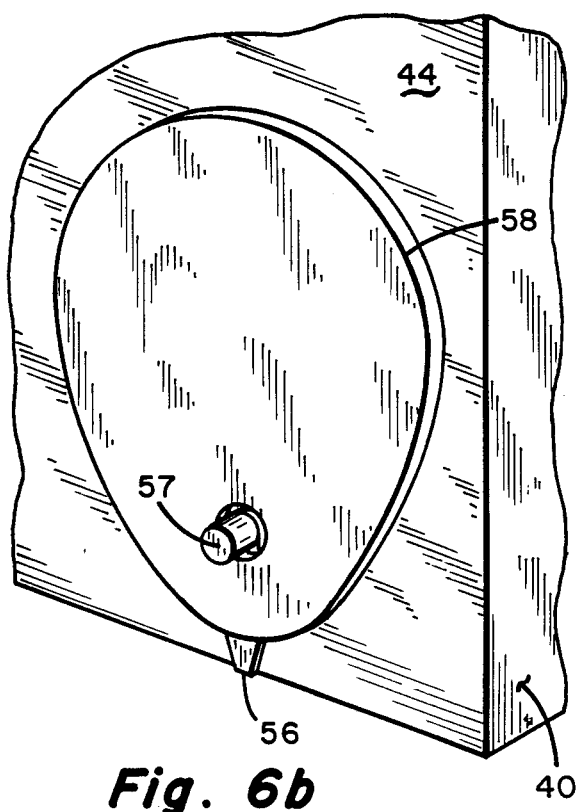

FIG. 6b shows the next layer, a conductive coil-metal plate 58 plated on next. In the preferred embodiment it is copper but other conductors are suitable also. A lead 66 is brought from the coil plate for connection to lead 44c (shown in FIG. 4).

Figure 6C:
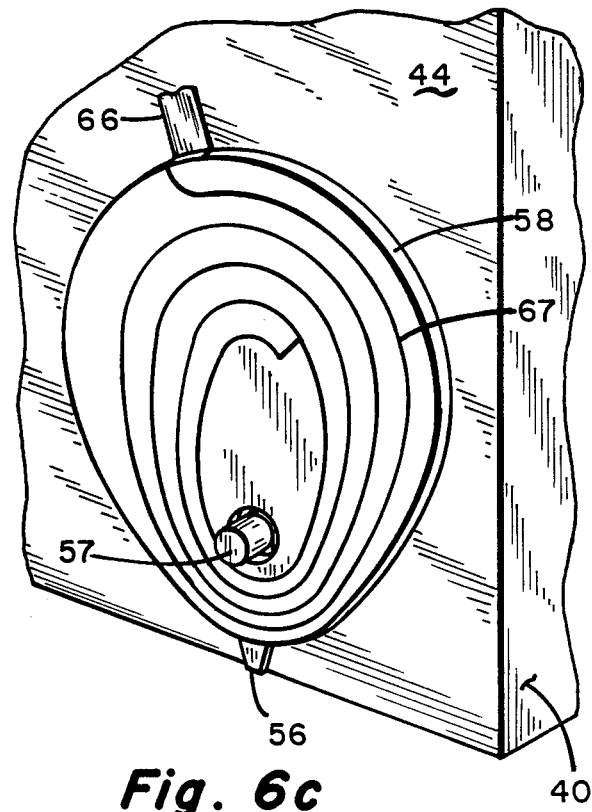

Refer to FIG. 6c. The coil shape is then etched as a groove 67 into the plate laid in FIG. 6b in FIG. 6c.

Figure 6D:
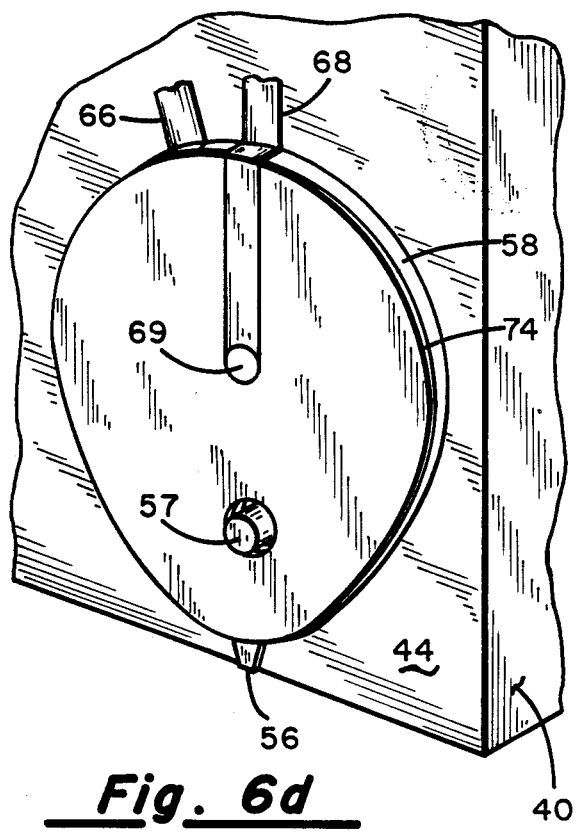

Refer to FIG. 6d. A layer of insulating material 74 (usually alumina in the preferred embodiment, but other insulators will also do), is then laid over the coil plate 58 and into the grooves 67, but a central area 69 is left uncoated. Into this central area 69 and along the path 68 (which is insulated from the coil plate 58) a conductor is laid for a center tap in the preferred embodiment. It is used for writing and is not relevant to the teachings of this invention. Another layer of insulation is then laid over the entire surface except for the areas of via 57 and 69.

Figure 6E:
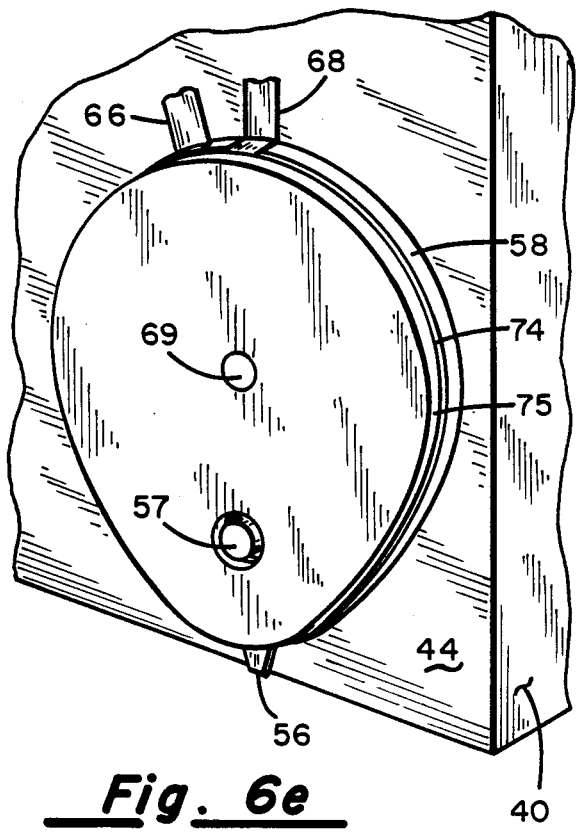

Refer to FIG. 6e. In this figure a new coil plate 75 is laid atop the insulation layer 74 (which contains the center tap to lead 68). The coils are connected through area 69.

Figure 6F:
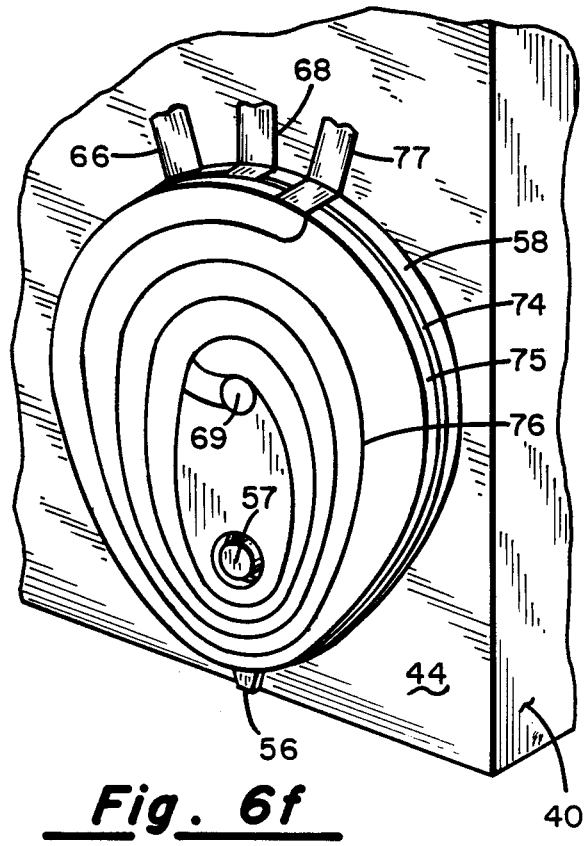

In FIG. 6f, the coil plate 75 is etched with grooves, 76 to form a coil, and a conductive lead 77 is laid down.

Figure 6G:
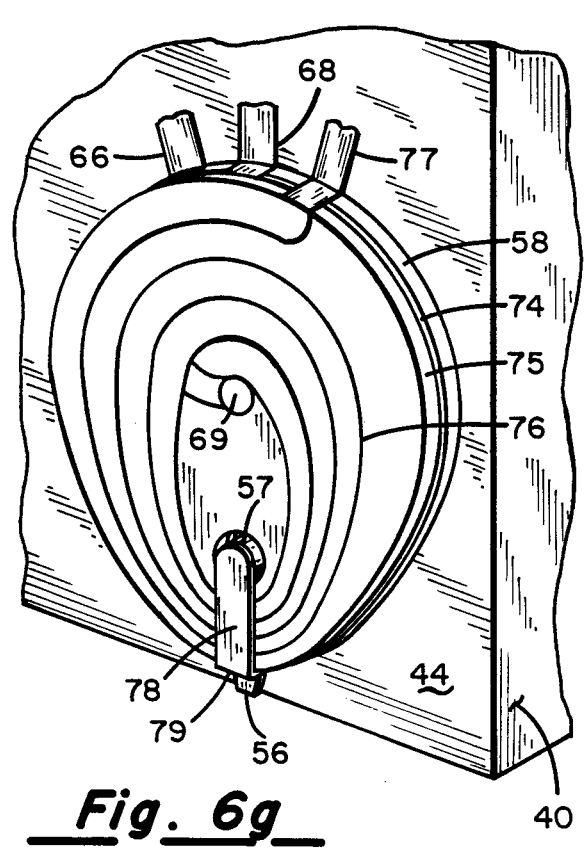

In FIG. 6g, the head is shown complete (sans an insulating layer on the coil plate 75). A top pole piece 78 has been laid with pole tip 79.

Shown as this is with a continuous coil, if the input lead is considered to be 66, the coil is wound clockwise. Accordingly, if this is the active transducer, the inactive transducer must be wound counter-clockwise to perform the function taught in this patent. Thus the coil in the active transducer is a mirror image, or oppositely coiled, from the coil in the inactive transducer.

What is claimed is:

1. A disk drive servo flyer with noise reduction means comprising:
    a flyer having a pair of spaced skis extending along the length of the flyer;
    each of the skis having an air bearing surface for flying closely adjacent the surface of a magnetic servo disk;
    a pair of thin film transducers mounted on one end of the flyer, one transducer attached to each ski;
    each of said thin film transducers having a coil;
    each of coils wound in a direction from the other such that electrical noise generated from nearby data read/write heads during writing on a respective magnetic data disk; induces substantially equal and opposite signals in said coils;
    a pair of leads connected to each coil at respective coil ends;
    a pair of pads for interconnection to circuitry external to said flyer;
    each of said leads of each coil connected to a respective pad such that the respective leads of each coil are interconnected through the respective pads, thereby forming a continuous circuit having at one ski a coil wound in one direction and at the other ski a coil wound in the opposite direction such that the amount of current induced by ambient noise in one of the thin film transducers is cancelled by a substantially equal and opposite current induced in the other of said thin film transducers;
    each of said thin film transducers further having a magnetic flux conducting core with a pair of pole tips extending toward the air bearing surface of said respective skis;
    the pole tips of one of said thin film transducers spaced sufficiently far from its ski air bearing surface so as to not be able to detect magnetic flux from said servo disk adjacent the respective ski at a signal level substantially greater than the ambient noise level, thereby disabling and rendering inactive said one transducer for reading data from said servo disk; and
    the pole tips of the other of said pair of thin film transducers extending to said ski air bearing surface so as to be able to detect magnetic flux from said servo disk adjacent the respective ski at a signal level substantially greater than and including the ambient noise level, thereby enabling and rendering active the other of said pair of transducers for reading data from said servor disk;
    whereby the servo flyer may be centrally located in a disk platter assembly close to a data read/write head, remain substantially unaffected by the noise created by said data read/write head when it writes onto said magnetic data disk and still read servo data from only one track on a servo data surface by means of said active thin film transducer.

2. The servo flyer of claim 1 wherein said pole tips are spaced from said air bearing surface by a process of lapping.

* * * * *